(12) United States Patent
Wampler, II et al.

(10) Patent No.: US 8,265,792 B2
(45) Date of Patent: Sep. 11, 2012

(54) METHOD AND APPARATUS FOR CALIBRATING MULTI-AXIS LOAD CELLS IN A DEXTEROUS ROBOT

(75) Inventors: Charles W. Wampler, II, Birmingham, MI (US); Robert J. Platt, Jr., Cambridge, MA (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 401 days.

(21) Appl. No.: 12/760,954

(22) Filed: Apr. 15, 2010

(65) Prior Publication Data

US 2011/0257784 A1 Oct. 20, 2011

(51) Int. Cl.
 G05B 19/04 (2006.01)
(52) U.S. Cl. .................................. 700/254; 700/260
(58) Field of Classification Search .................. 700/254, 700/260
See application file for complete search history.

(56) References Cited

U.S. PATENT DOCUMENTS

| | | | | |
|---|---|---|---|---|
| 4,132,318 A | * | 1/1979 | Wang et al. ................... | 414/591 |
| 6,070,109 A | * | 5/2000 | McGee et al. ................ | 700/259 |
| 6,292,716 B1 | * | 9/2001 | Moore, Jr. et al. ............ | 700/260 |
| 6,952,629 B2 | * | 10/2005 | Takamura et al. ............ | 700/259 |
| 8,175,749 B2 | * | 5/2012 | Tsusaka et al. ............... | 700/254 |
| 8,185,243 B2 | * | 5/2012 | Okazaki ........................ | 700/260 |
| 8,195,334 B2 | * | 6/2012 | Fukushima et al. .......... | 700/260 |

* cited by examiner

Primary Examiner — Eric Culbreth
(74) Attorney, Agent, or Firm — Quinn Law Group, PLLC

(57) ABSTRACT

A robotic system includes a dexterous robot having robotic joints, angle sensors adapted for measuring joint angles at a corresponding one of the joints, load cells for measuring a set of strain values imparted to a corresponding one of the load cells during a predetermined pose of the robot, and a host machine. The host machine is electrically connected to the load cells and angle sensors, and receives the joint angle values and strain values during the predetermined pose. The robot presses together mating pairs of load cells to form the poses. The host machine executes an algorithm to process the joint angles and strain values, and from the set of all calibration matrices that minimize error in force balance equations, selects the set of calibration matrices that is closest in a value to a pre-specified value. A method for calibrating the load cells via the algorithm is also provided.

17 Claims, 2 Drawing Sheets

METHOD AND APPARATUS FOR CALIBRATING MULTI-AXIS LOAD CELLS IN A DEXTEROUS ROBOT

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to the calibration of strain sensors or load cells of the type used by a dexterous robot.

BACKGROUND OF THE INVENTION

Robots are able to grasp and manipulate objects using a series of linkages, which in turn are interconnected via one or more motor-driven robotic joints. End-effectors are the particular linkages used to perform a given task at hand, e.g., the grasping of a work tool or other object. Humanoid robots are a dexterous type of robot having an approximately human structure or appearance, whether a full body, a torso, a hand, or another appendage. The structural complexity of a dexterous robot is largely dependent upon the complexity of the commanded work task.

Due to the wide spectrum of work tasks that can be performed by a dexterous robot, a complex sense of touch is often required to enable handling of objects in a precise and reliable manner. Miniature strain sensors or multi-axis load cells are one possible sensor type adapted for measuring linear force and torque at or along various contact surfaces, e.g., between mating fingers and/or a thumb of the same or different robotic hands.

SUMMARY OF THE INVENTION

Accordingly, a method and apparatus are provided herein that enable the in-situ calibration of multi-axis load cells used aboard a dexterous humanoid robot, i.e., calibration of the load cells while the load cells remain integrated within the architecture of the robot, and therefore without resorting to the use of an external calibration jig. In one embodiment, the load cells are integrated into different contact surfaces of an anthropomorphic hand of a dexterous robot. The robot is controlled such that mating pairs of the load cells are automatically pressed or touched together in a variety of robotic poses, with the constraint that any applied forces on each mating pair of load cells is equal and opposite.

Using the present method, the robot can self-calibrate its various load cells as needed without using an external calibration jig, as noted above. An external calibration jig is a structure of the type known in the art where strains are measured offline and compared to calibrated applied forces and torques. It may be difficult to calibrate a six-axis load cell mounted on or within a robot, but it is often necessary to do so, as over time load cell calibration can drift due to mechanical changes in the strain measuring structure of the load cell. This is especially true for miniature load cells. Therefore, in an anthropomorphic robot hand with fingers and an opposable thumb, the technique allows in-situ calibration of multiple load cells located in the fingertips/thumb tip and the proximal phalanges of the hand, at any time, simply by pressing or touching the load cells together and processing certain strain and joint angle measurements as set forth herein.

In particular, a robotic system includes a dexterous robot having a plurality of robotic joints, a plurality of angle sensors each measuring a joint angle value at a corresponding one of the robotic joints, a plurality of multi-axis load cells for measuring a strain value imparted to a corresponding one of the load cells during a predetermined pose of the robot, and a host machine. The host machine is electrically connected to each of the load cells and the angle sensors, and is configured to receive the joint angles from the angle sensors and the set of strain values from the load cells during the predetermined pose. The robot is adapted for pressing a selected pair of the load cells together during the predetermined pose. The host machine is adapted for processing the joint angles and the strain values to thereby determine a set of calibration matrices, and for determining a calibration matrix from the set of calibration matrices that is closest in a value to a pre-specified value, e.g., a value expected from an engineering analysis of the design of the load cells, a calibration matrix found in the most recent previous calibration run, etc.

The host machine includes a hardware module that is electrically connected to each of the load cells and to each of the angle sensors. The host machine is configured to receive the joint angles from the angle sensors and the strain values from the load cells during the predetermined pose, and includes an algorithm for calibrating the load cells using the joint angle values from the angle sensors and the strain values from the load cells.

The method for calibrating load cells in a dexterous robot having a plurality of robotic joints includes pressing together a mating pair of the load cells to form the predetermined pose, measuring the joint angles from the angle sensors and the strain values from the load cells during the predetermined pose, processing the joint angles and strain values via a host machine to thereby determine a set of calibration matrices, and determining a calibration matrix that is closest in a value to the pre-specified initial value noted above.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
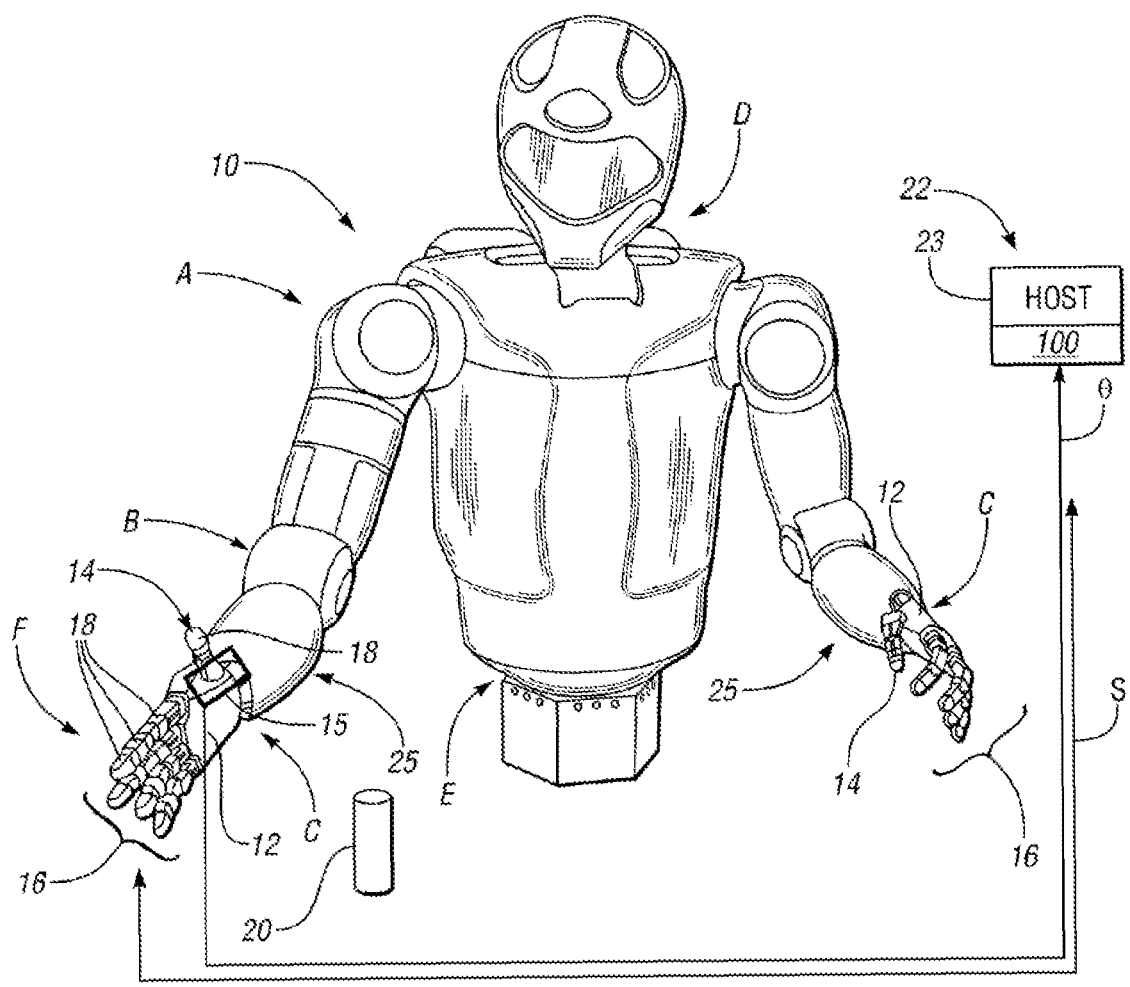
FIG. 1 is a schematic perspective view illustration of a dexterous robot having multi-axis load cells that may be calibrated according to the method set forth herein.

With reference to the drawings, wherein like reference numbers refer to the same or similar components throughout the several views, and beginning with FIG. 1, a dexterous robot 10 is adapted to perform one or more automated tasks. The robot 10 is configured with independently and/or interdependently-moveable motor-driven robotic joints, such as but not limited to a shoulder joint, the position of which is generally indicated by arrow A. The robot 10 may also include an elbow joint (arrow B), a wrist joint (arrow C), a neck joint (arrow D), a waist joint (arrow E), and finger joints (arrow F). Each of the joints includes one or more joint angle sensors 15 adapted for measuring joint angles (A), and for relaying these angular measurements to a host machine (HOST) 22 for processing via a sensor calibration algorithm 100 as explained below.

The robot 10 includes a lower arm assembly 25 having one or more anthropomorphic hands 12. Each hand 12 includes an opposable thumb 14 and a plurality of fingers 16, which together are capable of grasping an object 20 in the same hand, or in a cooperative grasp between different hands. Thumb 14 and each of the fingers 16 includes one or more multi-axis load cells 18 as described below, i.e., sensors each adapted for measuring one or more strain values (s) and for relaying the measurements to the host machine 22.

Host machine 22 is electrically connected to the robot 10 and adapted, via execution of algorithm 100, for calibrating the load cells 18 in-situ, i.e., while the load cells remain fully integrated within the architecture of the robot, and therefore without resorting to the use of an external calibration jig. The host machine 22 may include a hardware module 23 including single or multiple digital computers or data processing devices each having one or more microprocessors or central processing units (CPU), read only memory (ROM), and random access memory (RAM). Host machine 22 may also include sufficient amounts of erasable electrically-programmable read only memory (EEPROM), a high-speed clock, analog-to-digital (A/D) circuitry, digital-to-analog (D/A) circuitry, and any required input/output (I/O) circuitry and devices, as well as signal conditioning and buffer electronics. Individual algorithms resident in host machine 22 or readily accessible thereby, including algorithm 100, may be automatically executed by the hardware module 23 as needed to provide the required functionality.

Figure 2:
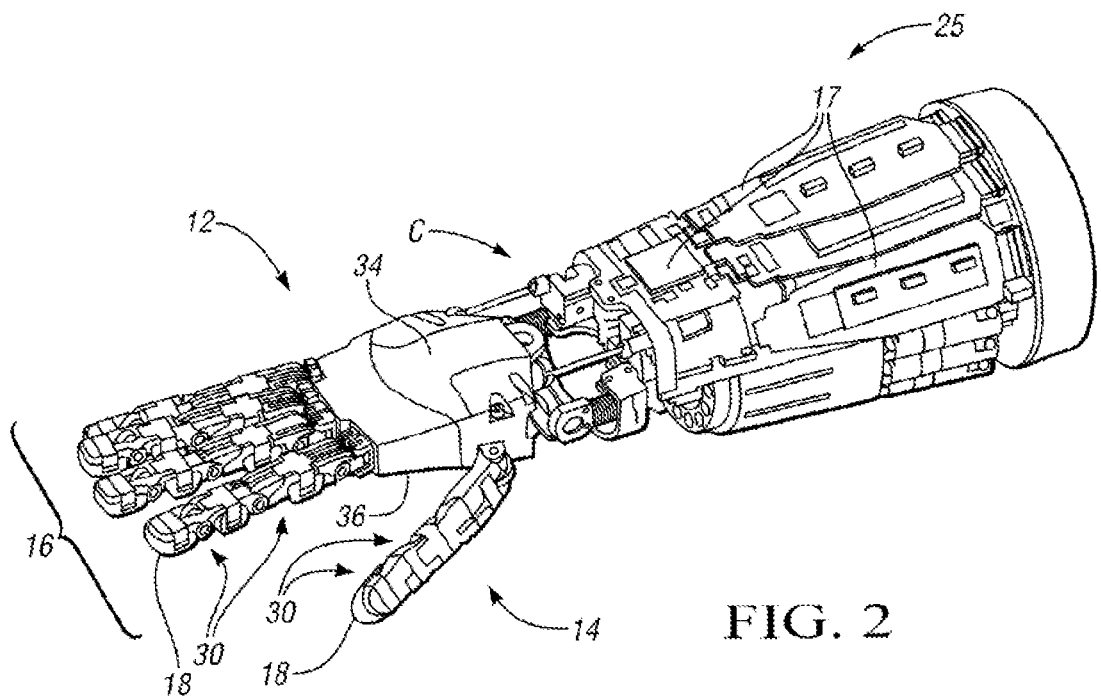
FIG. 2 is a perspective view illustration of a lower robotic arm assembly of the robot shown in FIG. 1.

Referring to FIG. 2, the lower arm assembly 25 is shown in more detail to include a hand 12 with a thumb 14 and fingers 16. The thumb 14 and fingers 16 are moveable alone or in combination via control elements 17 that may be embedded in the lower arm assembly 25 as shown. The hand 12 includes a base structure 34 that defines a palm 36. The thumb 14 and fingers 16 are movably mounted to the base structure 34, and are adapted to selectively curl toward the palm 36 in order to grip an object, e.g., the object 20 shown in FIG. 1. Thumb 14 and fingers 16 each include segments or phalanges 30 that are connected by joints (arrow F) and that are selectively powered via joint actuators such as motors, etc.

A multi-axis load cell 18 is connected to or integrated within each of the respective phalanges 30 of thumb 14 and fingers 16. Load cells 18 are adapted to read and transmit strain data (s) to the host machine 22 of FIG. 1, wherein the strain data is processed to ultimately determine forces (f) as set forth below. While each load cell 18 should read at least one strain value, generally three strain values or more are measured to determine three force components. In one embodiment, each load cell 18 measures eight different strains simultaneously, although other strain value quantities may be used without departing from the intended scope of the present invention. While not shown for clarity, compact electronics may be provided within the hand 12 to power the various load cells 18, e.g., collecting analog sensor data, converting analog signals to digital signals, multiplexing digital signals, and communicating the data as needed.

Figure 3:
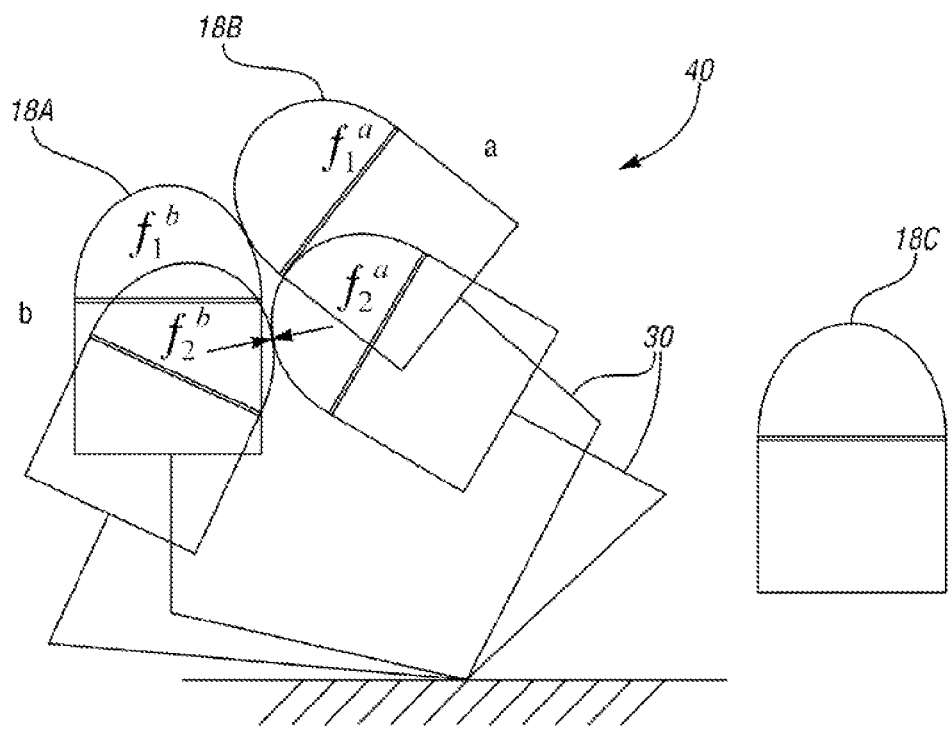
FIG. 3 is a schematic illustration of a controlled contact between a mating pair of multi-axis load cells.

Referring to FIG. 3, a mating pair 40 of multi-axis load cells 18A, 18B is represented schematically. The mating pair 40 may be positioned in or on the fingertips of two fingers 16, or on a tip of a finger and a thumb 14, whether of a common hand 12 or of different hands. The load cells 18 may be self-calibrated by touching load cells 18A, 18B together in different poses, and optionally to a calibrated load cell 18C as noted below. As will be understood by those of ordinary skill in the art, a given load cell can be used to measure an applied force (f) by multiplying measured strains (s) by a linear transform or calibration matrix (K), i.e., f=Ks. This basic force equation is used by the host machine 22 in executing algorithm 100 to self-calibrate the load cells 18 used aboard robot 10 of FIG. 1.

Figure 4:
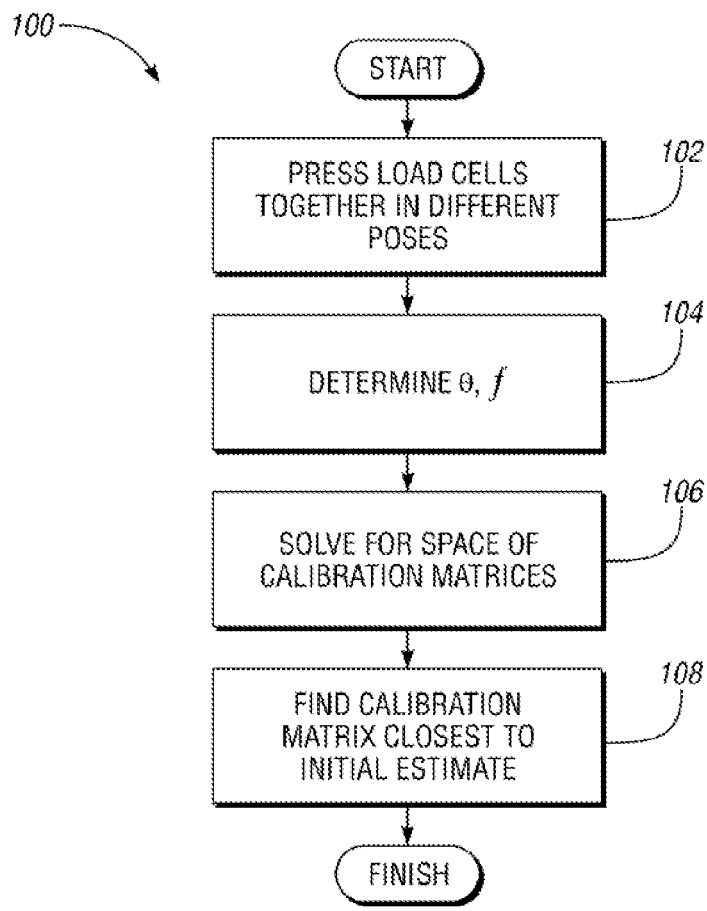
FIG. 4 is a flow chart describing a method for calibrating the multi-axis load cells of the robot shown in FIG. 1.

Referring to FIG. 4, algorithm 100 is explained in conjunction with the schematic illustration of FIG. 3. As will be understood by those of ordinary skill in the art, a load cell is conventionally calibrated by extracting the load cell from its host robot and mounting the load cell in an external jig containing a calibrated reference load cell. Various forces and torques applied to the load cell to be calibrated are also measured by the calibrated load cell via the jig. A calibration matrix (K) for the load cell being calibrated is determined such that its force and torque outputs match the jig measurements as closely as possible. In a highly complex dexterous robot in which multiple load cells are fully and intricately integrated into the structure of the robot, the conventional external jig-based calibration technique may become highly impracticable.

Algorithm 100 is therefore executed via the host machine 22 to allow self-calibration of the various load cells 18 shown in FIGS. 1 and 2, doing so while the load cells remain in-situ. The algorithm 100 begins with step 102, wherein selected load cells 18A, 18B shown in FIG. 3 are pressed or touched together in a series of different poses, e.g., poses 1 and 2, to exert equal opposing forces W. In FIG. 3, $f_1^b$ and $f_2^b$ represent forces (f) applied by a digit B, i.e., a thumb 14 or a finger 16 of either hand 12, having a load cell 18B positioned in a first and second pose (1 and 2), respectively, while $f_1^a$ and $f_2^a$ respectively represent opposing forces applied by a load cell 18A of an opposing digit B in the same poses.

It is assumed that forces on digit A are given by the formula: $f^a=Ks^a$. The value for sensor calibration matrix (K) for digit A is always the same, but different sensor readings from that digit A correspond to different forces applied to the same digit, i.e., a thumb 14 or finger 16 as noted above. After K is known, one may compute forces in digit A using readings from the sensors of that same digit, i.e., $f^a=Ks^a$. Additional external contacts may provide measurements that can be added to the sensor measurement set to improve the overall calibration results. For example, contact with a calibrated load cell, e.g., load cell 18C, and/or a known weight provides a known force, and/or a low-friction surface of known orientation provides a force of unknown magnitude but known direction.

Beginning at step 102, and with reference to the structure of robot 10 shown in FIG. 1, selected load cells 18A and 18B of FIG. 3 are pressed together by the robot in a first pose with equal and opposite force. The algorithm 100 then proceeds to step 104.

At step 104, for each pose the joint angles (A) and strains (s) are sensed, measured, or other otherwise fully determined at the load cells 18A, 18B of the respective contacting digits A and B, i.e., the mating pair 40 shown in FIG. 3. The joint angles (A) are measured for each pose by joint sensors 15 at contacting load cells 18A and 18B of FIG. 3 so that their respective orientations can be determined in a common frame of reference. Load cell position and orientation are ultimately determined from these values via the host machine 22. If the load cells of the mating pair 40 are positioned on different hands 12, e.g., a left-hand finger touching a right-hand finger, all joint angles must be determined in the mechanical chain between the mating pair, that is, down one finger, through both arms, and up the other finger, so that the common frame of reference, e.g., the torso, falls within the chain. Multiple mating pairs 40 can be included in the same sensor measurement set, along with the additional external contacts noted above in step 102. Sensor readings $s_i^a$, $s_i^b$ are therefore measured at a variety of orientations or poses $R_i^a$, $R_i^b$, where i=poses 1, 2, 3, etc.

At step 106, the host machine 22 solves a homogeneous set of equations for space of valid calibration matrices:

$$0 = \begin{pmatrix} f_1^a \\ f_2^a \\ \vdots \end{pmatrix} + \begin{pmatrix} f_1^b \\ f_2^b \\ \vdots \end{pmatrix}$$

$$= \begin{pmatrix} R_1^a K s_1^a \\ R_2^a K s_2^a \\ \vdots \end{pmatrix} + \begin{pmatrix} R_1^b J s_1^b \\ R_2^b J s_2^b \\ \vdots \end{pmatrix}$$

In these matrices, the variable J represents a calibration matrix for the opposing finger/thumb or digit B. Note that the R matrices are subscripted, indicating that these values change as the mating pair moves. Also note that the calibration matrices (K, J) appear linearly in this system of equations.

At step 106, the host machine 22 characterizes all of the matrix pairs (K, J) that minimize the error in the force balance equations noted above. The minimizing set for a least-squares error criterion, by way of example, can be found using standard linear algebra, e.g., the singular-value decomposition or QR decomposition methods. All dimensions of the calibration matrices may not be fully determined, but the resultant calibration will be more accurate relative to the initial calibration.

At step 108, the calibration matrix is found that is closest to an initial estimate. Among all error-minimizing pairs from step 106, the pair (K, J) is selected that is closest to the initial estimate. Standard computational linear algebra applies if "closeness" is formulated in the least-squares sense according to the possible embodiment set forth above. The selected pair is then used to calibrate the load cells 18A, 18B of the mating pair.

As noted above, calibration matrices (K, J) for the load cells 18A, 18B may be determined up to an unknown scaling factor. The scaling factor may also be determined if at least one independent force measurement of known magnitude can be made, such as by supporting a known weight or by executing a single touch to a well-calibrated load cell, e.g., load cell 18C in FIG. 3. Even if only partial information can be extracted due to insufficiency in the relative poses of load cells 18A and 18B, this information can still be used to update and improve the pre-existing calibration.

For clarity of explanation, the examples set forth above describe a simplified two-digit pose. However, the scope of the present method is not limited to just two poses, and may involve touches between various load cells 18 on additional digits of the fingers. Calibration could involve a second finger, e.g., digit C (not shown), with digit A touching digit B multiple times before touching digit C multiple times. The calibration matrix for additional digit C may be represented as (H). One may then calibrate set (K, J, H) as a triple of calibration matrices, and not just pair-wise, i.e., first for calibration set (K, J), then for calibration set (K, H). If these steps are performed pair-wise, different values for (K) may result, and one would then have to reconcile those differences to obtain the best value of (K). Therefore, for optimized performance all the balance equations may be combined into a single array, all the calibration matrices may be solved for simultaneously. In a similar manner, one could collect data for any number of pair-wise touches for as many load cells 18 as there are on the various thumbs 14 and/or fingers 16 and their several phalanges 30.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
    a dexterous robot having a plurality of robotic joints;
    a plurality of angle sensors each adapted for measuring a joint angle value at a corresponding one of the robotic joints;
    a plurality of load cells each adapted for measuring at least one strain value imparted to a corresponding one of the load cells during a predetermined pose of the robot; and
    a host machine that is electrically connected to each of the load cells and to each of the angle sensors, the host machine being configured to receive the joint angles from the angle sensors and the at least one strain value from each of the load cells during the predetermined pose;
    wherein the robot is adapted for pressing a mating pair of the load cells together to form the predetermined pose, and wherein the host machine is adapted for processing the joint angles and the strain values to thereby determine a set of calibration matrices, and for determining a calibration matrix from the set of calibration matrices that is closest in a value to a pre-specified value.

2. The robotic system of claim 1, further comprising an anthropomorphic robotic hand having an opposable thumb and a plurality of fingers, wherein at least one of the load cells are disposed on the thumb and on each of the fingers.

3. The robotic system of claim 1, wherein the host machine is adapted for minimizing an error in a set of force-balance equations by calculating the set of calibration matrices for each of the load cells of the mating pair.

4. The robotic system of claim 3, wherein the host machine minimizes the error using a least-squares technique.

5. The robotic system of claim 1, wherein the host machine is adapted for determining a common frame of reference for the mating pair using the joint angles corresponding to the mating pair.

6. The robotic system of claim 1, wherein the robot is adapted for executing different predetermined poses in succession, and wherein the host machine is adapted for calculating the calibration matrix for each mating load cell pair used in the different predetermined poses.

7. The robotic system of claim 6, including a pre-calibrated load cell separate from the plurality of load cells, wherein the robot is adapted for touching one of the load cells to the pre-calibrated load cell to form one of the different predetermined poses.

8. A host machine adapted for use within a robotic system, the robotic system including a dexterous robot having a plurality of robotic joints, a plurality of angle sensors each adapted for measuring a joint angle value at a corresponding one of the robotic joints, and a plurality of load cells each adapted for measuring a set of strain values during a predetermined pose of the robot, the robot being adapted for pressing a mating pair of the load cells together to form the predetermined pose, the host machine comprising:

a hardware module that is electrically connected to each of the load cells and to each of the angle sensors, and configured to receive the joint angles from the angle sensors and the strain values from the load cells during the predetermined pose; and an algorithm for calibrating the load cells using the joint angle values from the angle sensors and the strain values from the load cells, wherein the algorithm is adapted for:

measuring the joint angles from the angle sensors and the strain values from the load cells during the predetermined pose, processing the joint angle and the strain values via a host machine to thereby determine a set of calibration matrices; and determining a calibration matrix from the set of calibration matrices that is closest in a value to a pre-specified value.

9. The host machine of claim 8, wherein the host machine is adapted for minimizing an error in a set of force-balance equations by calculating a pair of calibration matrices for each of the load cells of the mating pair.

10. The host machine of claim 9, wherein the host machine minimizes the error using a least-squares technique.

11. The host machine of claim 8, wherein the host machine is adapted for determining a common frame of reference for the mating pair using the joint angles corresponding to the mating pair.

12. The host machine of claim 8, wherein the robot is adapted for executing different predetermined poses in succession, and wherein the host machine is adapted for calculating a calibration matrix for each mating load cell pair used in the different predetermined poses.

13. A method for calibrating load cells in a dexterous robot having a plurality of robotic joints, a plurality of angle sensors each adapted for measuring a joint angle value at a corresponding one of the robotic joints, a plurality of load cells each adapted for measuring a set of strain values imparted to a corresponding one of the load cells during a predetermined pose of the robot, the method comprising:

pressing together a mating pair of the load cells to form the predetermined pose;

measuring the joint angles from the angle sensors and the strain values from the load cells during the predetermined pose;

processing the joint angle and the strain values via a host machine to thereby determine a set of calibration matrices; and determining a calibration matrix from the set of calibration matrices that is closest in a value to a pre-specified value.

14. The method of claim 13, wherein the robot includes a finger and a thumb each having one of the load cells, and wherein pressing together a mating pair of the load cells includes pressing together the respective load cells of the finger and thumb.

15. The method of claim 13, further comprising: minimizing an error in a set of force-balance equations by calculating the set of calibration matrices for each of the load cells of the mating pair.

16. The method of claim 13, further comprising: determining a common frame of reference for the mating pair using the joint angles corresponding to the mating pair.

17. The method of claim 13, further comprising:
executing different predetermined poses in succession; and
calculating the calibration matrix for each mating load cell pair used in the different predetermined poses.

* * * * *